United States Patent [19]

Porter et al.

[11] 3,737,488

[45] June 5, 1973

[54] PROCESS FOR PRODUCING MOULDED FOAMS FROM RUBBER LATICES BY USING MICROWAVE HEATING

[75] Inventors: David Porter; William Shore Campbell; Edward William Duck, all of Southampton, England

[73] Assignee: The International Synthetic Rubber Company, Limited, Hampshire, England

[22] Filed: June 30, 1970

[21] Appl. No.: 51,371

[30] Foreign Application Priority Data

July 4, 1969 Great Britain.....................33,967/69

[52] U.S. Cl..................264/26, 260/2.5 L, 260/723, 264/50, 264/331, 264/347, 264/DIG. 46
[51] Int. Cl............................B29d 27/04, B29b 5/26
[58] Field of Search......................264/22, 51, 25, 50, 264/331, 347, DIG. 46, 26; 260/2.5, 25 L, 723; 204/160.1, 159.17, 159.2, 159.22

[56] References Cited

UNITED STATES PATENTS

| | | | |
|---|---|---|---|
| 2,512,464 | 6/1950 | Mann | 260/2.5 |
| 2,484,434 | 10/1949 | Van Buskirk et al. | 260/2.5 |
| 2,261,439 | 11/1941 | Kelly, Jr. | 260/2.5 |
| 2,659,703 | 11/1953 | Toulmin | 260/2.5 |
| 2,441,548 | 5/1948 | Sperry | 264/26 |
| 2,604,666 | 7/1952 | Bosomworth | 264/50 X |

FOREIGN PATENTS OR APPLICATIONS 144,807   2/1948   Australia.............................260/2.5

Primary Examiner—Philip E. Anderson
Attorney—Cushman, Darby & Cushman

[57] ABSTRACT

A process for preparing a moulded foam comprises subjecting a foamed curable rubber latex composition containing a delayed action or heat sensitive gelling system in a closed mould to radiation of radio frequency, preferably of a frequency at least 20 mc/sec and in one embodiment of the invention at least 800 mc/sec, of an intensity and for a duration to cause gelling and thereafter curing the gelled foam to a solid foamed article. The invention is very applicable to the preparation of foamed articles from a filled latex of an emulsion polymerized styrene-butadiene rubber.

22 Claims, No Drawings

PROCESS FOR PRODUCING MOULDED FOAMS FROM RUBBER LATICES BY USING MICROWAVE HEATING

This invention relates to the production of moulded foams from rubber latices. It enables in particular a rapid and efficient production of such foams with excellent structure and physical properties.

In the production of moulded foams gelling agents are normally used, and these may be classified according to whether they are delayed action or heat sensitive gelling agents. The delayed action gelling agents are normally used in the so-called Dunlop process, while the heat sensitive agents are normally used in spread foam and moulded slab stock. The materials concerned are well known, and they and the processes in which they are used, conventionally are described inter alia in "Latex Foam Rubber" by E.W. Madge, Maclaren & Sons Ltd., 1962.

In the present invention a delayed action or a heat sensitive system may be used, the former being preferred. When using such systems a foam of a compounded latex including the gelling agent(s) is prepared and allowed to gel in a closed mould. Gelling is conventionally carried out at room temperature or slightly elevated temperature e.g. 40°–50° C., although higher temperatures e.g. 70°–80° C. may be used. Subsequently, the gelled foams are cured by heating, normally be application of steam. After the cure, the mould is opened and the cured foam rubber article removed and dried.

According to the present invention there is provided a process for preparing a moulded foam comprising subjecting a foamed curable rubber latex composition containing a delayed action or heat sensitive gelling system in a closed mould to radio frequency radiation of an intensity and for a duration to cause gelling, and thereafter curing the gelled foam to a solid foamed article.

In conventional processes in which a delayed action gelling system is used gelling is normally arranged to occur within 3 to 4 minutes from addition of the gelling agent, this delay being sufficient to permit refining of the compounded latex for 1 to 1½ minutes and filling and closing of the mould without undue risk of premature gelation. Provision for longer delay to reduce risks of premature gelation is economically undesirable since the mould is consequently occupied for longer, thereby lowering production rates. Where a heat sensitive gelling system is used, there is little effect upon the stability of the latex at room temperature but above a temperature of e.g. 40° C rapid gelation of the latex occurs. Heat sensitive gelling systems have however several disadvantages and for this reason delayed action systems find much wider application especially where comparatively thick (e.g. more than 2cm) products are to be prepared.

It has now been found however that when radio frequency radiation is applied to latex compositions containing a delayed action or heat sensitive gelling system extremely rapid gelation can be obtained, e.g. within 10 to 15 seconds. It has further been found that if gelling is caused considerably more rapidly than hitherto, a markedly improved structure is obtained in the final foamed article after the cure. This excellent structure is obtained even where similar or greater quantities of fillers are used than is generally the case in Dunlop type processes. The application of radio frequencies to latex compositions causes considerable internal heating on account of the substantial quantities of water present. This water causes a high loss factor and enables rapid energy absorption, particularly where high frequencies are employed, with consequent rapid gelling.

The radio frequency radiation may generally have a frequency of at least 20 megacycles per second (mc/s). Radio frequencies, e.g. in the range 20 to 80 mc/s, giving rise to dielectric heating, can be used, particularly where a series of articles of standard size is to be produced. However dielectric heating has the disadvantage that it must be applied by means of two electrodes accurately spaced on opposite sides of the latex composition in the mould, since the power imparted to the foamed composition is dependent on the electrode spacing. Accordingly changes in the shape of the articles to be prepared from the latex require adjustments of the electrodes, causing appreciable inconvenience in production. It is therefore generally preferred to employ what is normally referred to as microwave radiation where the frequencies used are substantially higher e.g. 300 – 300,000 mc/s, normally at least 800 mc/s. When using a microwave radiation source the radiation can be contained within a closed space of sufficient size to contain the mould. The energy absorbed per unit volume of the latex composition is not dependent on the shape of the foamed latex being gelled, and accordingly articles of differing shapes can readily be produced without time consuming adjustments being needed. Normally, microwave frequencies are of the order of 800 – 2,500 mc/s but frequencies outside this range are also useful.

Frequencies of 900 mc/s and 2,450 mc/s are two frequencies in the higher range allocated by law for industrial purposes although from the practical point of view other frequencies are equally useful. There is no apparent difference in the process used or product obtained at 900 mc/s compared with 2,450 mc/s although at the higher frequency more care must be taken to avoid the danger of stray radiation contacting operating personnel. This necessitates a complex system of gates if continuous operation is to be achieved. Power required depends on the batch weight. Commonly the power required is in the range 0.5 kw. to 200 kw. or more. Care must be taken in selecting the intensity of the radiation since too rapid a heating arising from the use of too intense a radiation may lead to inferior products. Preferably the intensity of the radiation is such that approximately 1.5 to 2.3 kilowatt per kilogram (kw/kg) of latex composition is applied although intensities outside these limits e.g. 0.5 to 5 kw/kg may in some cases be suitable.

The process used for gelling the foam is also used for curing the gelled foam although curing by conventional means e.g. by steam heating may be used. It is particularly convenient to have a continuous process in which the radio frequencies first gel the compounded latex composition and then cure the gelled latex to a solid article. Where radio frequencies are employed to cure, the cure times are of the order 2 to 6 minutes, depending on the intensity of radiation applied. The mould containing the gelled compound remains closed during the curing step.

The mould used in the process of the present invention must be made of non-conducting material and it must not absorb microwaves to any great extent. It is therefore desirable that the mould material has a loss factor lower than the loss factor of the latex composition at the frequency of the applied radiation. Generally the loss factor is lower than e.g. 0.5 commonly 0.05 to 0.15. Examples of suitable materials are wood, glass fibre, reinforced polyester, reinforced phenolic resin or a mixture of these. A combination of glass reinforced polyester as the major material with an asbestos reinforced phenolic resin as the mould lining has been found to give very good results. It is generally desirable to preheat the mould uniformly to e.g. 50° to 70° C since this causes a surface skin to form and optimum surface finish is obtained. After curing the article is removed from the closed mould and dried, e.g. by use of hot air.

In preparing latex compositions for use in the present invention, wherein a delayed action gelling system is used it is desirable to select the type and amount of gelling system such that a substantial delay in gelling occurs at room temperature, since this gives the optimum gelling speed at higher temperatures as reflected in the processing and product physical properties. Accordingly the compounded latex composition preferably has a gelling time at room temperature (25° C.) (cold gel time) of at least 10 minutes e.g. 10 to 20 minutes, more preferably at least 15 minutes. During this time no or only a very slight increase in viscosity occurs. Such times significantly reduce risks of premature gelation of the composition before the mould has been filled and closed. However in spite of the longer delayed action at ambient temperatures, by using radio frequencies gelling can still occur in from e.g. 5 to 10 seconds. A further advantage of the present invention is that the tendency to form surface defects is reduced as compared with the conventional Dunlop process where steam is employed to cause gelling.

The latices that may be used in this process may be any of those suitable for production of latex foams by the Dunlop process. Examples are styrene-butadiene rubber, polybutadiene rubber, polyisoprene rubber, chloroprene rubber or mixtures thereof. Natural rubber is also suitable either alone or in any mixture with other rubbers such as those just mentioned. Where such a blend with natural rubber latex is used preferably up to 50 percent of the rubber solids in the latex composition, e.g. from 20 to 50 percent is natural rubber. Using the process of the invention rubber latex foams having excellent physical properties may be obtained from latex compositions containing synthetic rubber latex alone as the rubber component. Where a synthetic rubber latex or mixture of such latices is used it is preferred that these are prepared in emulsion using an anionic emulsifier optionally in conjunction with a non ionic secondary emulsifier. Latices prepared using one or more alkali metal salts of an organic carboxylic acid having at least 12 carbon atoms, e.g. a chain length of 12 to 18 carbon atoms, particularly the salts of fatty acids or disproportionated rosin acids such as potassium stearate, potassium oleate or sodium rosinate, are very suitable. The process is particularly applicable to the preparation of foams from styrene-butadiene rubber latices in which the weight percentage of butadiene is generally at least 50 percent more usually 70 percent or more.

The rubber latices may be reinforced by the addition of a nonrubbery latex, for example a polystyrene or polyvinylchloride latex. Normally the proportion of such non-rubbery latex is up to 50 parts per 100 parts of rubber (on a dryweight basis) generally in the range 10 – 30 phr.

It is highly desirable that the latex composition should contain an anionic cellulose derivative e.g. a sodium salt of a carboxy methyl cellulose generally in an amount of at least 0.01 parts by weight per 100 parts of rubber solids (phr). e.g. 0.03 to 5.0. Preferably the amount used is in the range 0.05 to 1.0 phr. The sodium salt of the carboxymethyl cellulose may be wholly or partly replaced by one or more alkali metal halides, for example potassium chloride. The use of such halides may in some cases be preferred since little change in viscosity of the latex composition occurs on the addition of the halide which facilitates processing. These materials are of particular value in maintaining good structure in the final cured foam especially where the rubber is entirely styrene butadiene rubber.

Delayed action gelling agents are generally known, typical examples being given in "Latex Foam Rubber" mentioned above. Preferred for the present invention are the fluocomplexes, such as fluosilicate, fluostannate, fluotitanate and fluozirconate. These materials may be salts of alkali metals e.g. sodium or potassium, the former being particularly preferred. The material most preferred is sodium silicofluoride. The gelling agent or agents may be used in conventional amounts e.g. 0.05 to 10.0 phr although in view of the rapid rise in temperature obtainable in the process of the invention lower amounts preferably from 1.00 to 4.00 phr may be used. As is known in the art, the quantities to be used in any particular instance depend on the article size and on the amount and type of soap, of filler and of the gel sensitiser.

Heat sensitive gelling agents are likewise known typical examples being given in "Latex Foam Rubber" referred to above. The most common of these is one wherein zinc ions, for example from zinc oxide, are used in combination with an ammonium salt e.g. acetate or nitrate. Zinc oxide may be used in an amount of 2 to 10 phr e.g. 4 – 6 phr, the amount of ammonium acetate being adjusted to obtain the required gelation time.

The compositions normally contain a gel sensitiser, suitably in an amount of up to 1.5 phr, preferably 0.1 to 1.0 phr. Typical materials are the guanidines, such as diphenyl guanidine and diortho tolyl guanidine. Other sensitisers that may be used are the polyamines such as ethylene formaldehyde amine. Such a material is sold under the trade mark "Vulcafor EFA" by I.C.I. Limited The composition includes sulphur for curing the gelled latex, suitably in an amount of from 0.1 to 5.0 phr, preferably 0.5 to 3.0 and most preferably 1.0 to 2.0 phr. The amount required is generally lower than is in conventional foam systems and this leads to improved physical properties in the product.

In general accelerators such as zinc diethyl dithiocarbamate (ZDC) and zinc mercaptobenzothiazole (ZMBT) are used. Suitably, in most applications amounts approximately equal to those of the sulphur are included in the composition. Thus the total amount of accelerator may be e.g. from twice to half of the amount of sulphur present.

The process of the present invention enables substantial quantities of fillers to be included in the composition while still providing good properties in the final cured foam. Typical fillers are Claysil (Trade Mark), china clay, whiting, silica, silicates and carbon black. The composition can have e.g. up to 75 phr of filler, though it is preferable to use from 10 to 40 phr, and more preferably 20 to 40 phr since at higher filler loadings the good surface appearance of the product may be impaired. Such materials do not affect the loss factor of the latex composition to any significant extent since water having a high loss factor is present in relatively large amounts.

As an example of a method of practising the present invention, a latex composition, containing rubber, emulsifier, sulphur, accelerator, antioxidant and fillers is foamed to the required density, by conventional means for example in a continuous mixer (e.g. Oakes machine) or a planetary batch mixer (e.g. Hobart). Before foaming it is desirable to mature the latex composition for a period of e.g. 24 to 48 hours to reduce the risk of surface skinning on moulding. This is particularly desirable where filler loading of e.g. 20 – 40 phr or higher are being used. When the compounded foam has the required density, the zinc oxide, gel sensitiser and delayed action gelling agent, preferably, together with an alkali metal carboxy alkyl cellulose, are then added to the foaming machine, and the mixture refined for e.g. 1 to 2 minutes. The compounded foam is then transferred to the mould, which is filled, closed and placed, e.g. in a microwave unit. Microwave radiation is then applied for approximately 4 minutes. In the first 5 to 10 seconds the foam is caused to gel, and curing proceeds over the remaining time. Following completion of the cure the mould is opened, the cured foam article removed and dried e.g. in hot air.

The following Examples illustrate the invention:

EXAMPLE 1

Using the procedure described above latex foams were prepared to the formulation given below.

| | Aqueous solution/ dispersion Concentration | Parts dry weight |
|---|---|---|
| Intex 100 | 68% | 100.0 |
| Potassium Oleate | 10% | 1.0 |
| Sulphur | 50% | 2.0 |
| ZDC (Zinc diethyl dithiocarbamate) | 50% | 1.0 |
| ZMBT (Zinc mercaptobenzothiazole) | 50% | 1.0 |
| Alkylated phenol antioxidant (Nonox WSL) | 33% | 1.0 |
| Claysil 315/2 | 50% | 20.0 |
| Sodium pyrophosphate | 10% | 0.05 |
| Zinc Oxide | 50% | 5.0 |
| Na CMC Sodium carboxy methyl cellulose | 2% | 0.2 |
| (DPG) (Diphenylguanidine) | 25% | 0.5 |
| SSF (Sodium silicofluoride) | 25% | 1.5 |

INTEX 100 is a high solids (68 percent) cold emulsion polymerised styrene-butadiene latex (INTEX is a registered Trade Mark)
NONOX is a Trade Mark of ICI Ltd
CLAYSIL (Trade Mark) is a felspar filler marketed by Compounding Ingredients of Manchester.

A maturation period of 48 hrs. was allowed before the compounded latex was beaten by means of a Hobart mixer, until a uniform foam of density abour 0.09 was obtained. At this point the gelling agents were added and dispersed in the foam and the mixture refined for 1½ minutes. The compounded foam was transferred to a preheated (50°-70° C.) mould constructed from reinforced polyester with an asbestos reinforced phenolic resin (DURESTOS) lining which was filled, closed and placed in a microwave unit. In this example an English Electric type 120 PMU 3B machine was used at a frequency of 2,450 mc/s. Other similar units are equally suitable. A batch weight of approximately 650 g. was used and a power of 1 – 1½ kilowatts was applied (approximately 1.5 to 2.3 Kw/Kg). Larger batch weights may require higher power to obtain a satisfactory gelation and curing rate e.g. up to 200 kilowatts although for small articles, only e.g. ½ kilowatt may be sufficient.

The foam in the mould was found to be satisfactorily gelled and vulcanised after 5 minutes under these conditions. A small sample of the latex compound retained at 25° C. gelled after 18 minutes (cold gel time).

As a comparison, latex foam having the same composition as the above only omitting the sodium carboxy methyl cellulose and increasing the sodium silicofluoride content to 4 parts (dry), was prepared by the Dunlop process. This compound had a cold gel time of approximately 7 minutes and a curing time of approximately 25 – 30 minutes was necessary at 100° C. in steam.

The physical properties of the two foams were measured and are given below

| | Microwave gelled and cured foam | Conventional Dunlop foam |
|---|---|---|
| Density (gms/cm³) | 0.094 | 0.09 |
| Tensile Strength - psi | 8.0 | 4.5 |
| Elongation at Break - % | 270 | 150 |
| Compression Modulus (at 40 % compression) (Force required for 40% compression (2.5 density) | 601* | 420* |

* Using 6" × 6" × 1" sample

From the above it can be seen that a substantial increase in cure rate can be achieved using microwave radiation whilst still maintaining good physical properties in the final foam. In addition the increased cold gel time of the latex foam composition allows much greater latitude in processing. The structure and surface appearance of the microwave gelled foam was excellent and superior to that of the Dunlop foam.

EXAMPLES 2 – 4

Latex foam compounds were prepared as in Example 1 to the following formulations:

| Example No. | % Concentration | 2 | 3 | 4 |
|---|---|---|---|---|
| | | Parts dry weight | | |
| Intex 100 | 68 | 100 | | 50 |
| Intex 105 | 65 | | 100 | |
| Potassium oleate | 10 | 0.5 | 0.5 | 1.0 |
| Natural rubber latex | 62 | | | 50 |
| Sulphur | 50 | 2.5 | 2.5 | 2.5 |
| ZDC | 50 | 1.0 | 1.0 | 1.0 |
| ZMBI | 50 | 1.0 | 1.0 | 1.0 |
| Antioxidant (Nonox WSL) | 33 | 1.0 | 1.0 | 1.0 |
| Claysil 315/2 | dry | (see below) | | |
| Zinc oxide | 50 | 5.0 | 5.0 | 5.0 |
| DPG | 25 | 0.5 | 0.5 | 0.5 |
| Na CMC | 2 | 0.2 | | |
| Potassium Chloride | 10 | | 0.3 | 0.3 |
| SSF | 25 | (1.5 to 2.5) as required | | |

INTEX 105 is a reinforced high solids cold emulsion polymerised styrene butadiene rubber latex.

The ingredients above the line were compounded in the order given and allowed to mature at 30° C for 16 hours. Zinc oxide DPG and Na CMC (or potassium chloride as the case may be) were preblended and added to the foamed latex followed by the silicofluoride.

After gelling and curing as before the physical properties of the foam products were measured according to British Standard Specification No. 903 (where applicable). These are given below.

Example No.

| | 2A | 2B | 3A | 3B | 4 |
|---|---|---|---|---|---|
| Filler loading (phr) | 0 | 20 | 20 | 40 | 20 |
| Foam density (g/cm³) | 0.077 | 0.092 | 0.091 | 0.10 | 0.10 |
| % Elong at break | 284 | 221 | 170 | 175 | 235 |
| Tensile Str. (psi) | 4.3 | 4.1 | 8.8 | 6.4 | 10.6 |
| % Compression Set (72 hours at 20°C) | 3.3 | 4.1 | 4.9 | 4.1 | 4.2 |
| Compression Modulus ** (×10⁻³) | | | | | |
| (a) Load at 25% compression density 2.5 | 5.6 | 5.3 | 5.9 | 5.4 | 4.3 |
| (b) Load at 40% compression density 2.5 | 12.5 | 11.8 | 15.9 | 13.0 | 10.6 |

** Using 2" × 1" sample 2.5

As will be seen, foams having good physical properties were obtained. In all cases the structure and surface appearance of the foam products were excellent.

EXAMPLE 5

The procedure of Example 2 was repeated to prepare latex foam products using the following formulation:

| | Parts dry weight |
|---|---|
| Neoprene Latex (type 650) | 100 |
| Rosin acid soap | 0.5 |
| Zinc oxide | 7.5 |
| Antioxidant | 1.0 |
| Sulphur | 2.0 |
| Thiocarbanilide | 2.0 |
| Trimene base | 1.25 |
| China Clay (Grade E) | 20.0 |
| Na CMC | 0.20 |
| SSF | 1.75 |

NEOPRENE is a polychloroprene marketed by E.I. Du Pont de Nemours and Co., Inc., (NEOPRENE is a Trade Mark).

The cold gel time of this formulation was 20 minutes. On subjection to radio frequency radiation as before the foam gelled and cured in 5 minutes.

The finished product exhibited good foam structure and physical properties.

EXAMPLE 6

The procedure of Example 2 was repeated to prepare latex foam products using the following formulation:

| | Parts dry weight |
|---|---|
| Butadiene-acrylontrile latex (33% acrylonitrile) | 100 |
| Rosin acid soap | 0.5 |
| Sulphur | 1.75 |
| ZDC | 2.0 |
| ZMBT | 1.5 |
| Antioxidant | 1.0 |
| China Clay (Grade E) | 20.0 |
| Zinc oxide | 3.0 |
| DPG | 0.75 |
| Na CMC | 0.2 |
| SSF | 2.0 |

The cold gel time of this formulation was 17 minutes. On subjection to radio frequency radiation as before the foam gelled and cured in 4½ minutes.

The product had good internal structure, surface appearance and physical properties.

EXAMPLE 7

A polybutadiene latex was prepared at 5° C by polymerisation in emulsion using a conventional "redox" activating system 5 parts per 100 of monomer of potassium oleate as emulsifier. The resultant latex was agglomerated using the process described in U.K. Pat. specification No. 976,212. After evaporation a latex of 65 percent total solids content was obtained.

Example 1 was repeated using this latex in place of INTEX 100 latex. Rubber foams having excellent structure and physical properties were obtained.

EXAMPLE 8

Example 1 was repeated except that the frequency of the radiation was 900 mc/sec. Essentially similar results were obtained.

EXAMPLE 9

Latex foam products were prepared as in Example 1 using the following formulation in which a heat sensitive gelling system replaces the delayed action gelling system:

| | Parts by weight (dry) |
|---|---|
| Intex 100 | 100.0 |
| Potassium oleate | 1.0 |
| Sulphur | 2.0 |
| ZDC | 1.0 |
| ZMBT | 1.0 |
| Antioxidant | 1.0 |
| CLAYSIL 315/2 | 20.0 |
| Whiting (3ML) | 10.0 |
| Ammonia (25%) | 0.3 |
| Zinc oxide | 3.0 |
| Ammonium acetate (20%) | 2.0 |

The cold gel time of this latex formulation was 60 minutes (at 20° C). On application of radio-frequency radiation as before the foam gelled and cured in 5 minutes.

The final product had an acceptable foam structure but not as good as the foams prepared in Examples 1 to 8.

EXAMPLE 10

Examples 1 and 2 were repeated except that the frequency of the radiation was varied. Frequencies of 20 mc/s and 80 mc/s were used in separate experiments. The foam gelled and vulcanised as before in approximately 5 mins. In all cases the structure and physical properties of the foam were excellent.

We claim:

1. A process for preparing a moulded foam comprising subjecting a foamed curable rubber latex consisting essentially of a rubber latex selected from the group consisting of latices lactics of natural rubber, styrene-butadiene rubber, polyisoprene rubber, chloroprene rubber and mixtures thereof and a delayed action gelling compound selected from the group consisting of fluocomplexes of fluosilicate, fluostannate, fluotitanate, fluozirconate and salts of alkali metals and heat sensitive gelling compounds selected from the group consisting of zinc oxide and ammonium salts selected from the group consisting of ammonium acetate and ammonium nitrate in a closed mould, to a microwave radio radiation having a frequency of from 300 to 300,000 mc/sec. to cause gelling within 5 to 15 seconds and thereafter curing the gelled foam by said radiation means at said frequency within 2 to 6 minutes.

2. A process according to claim 1 wherein a sodium salt of a carboxy methyl cellulose is included in the latex composition.

3. A process according to claim 2 wherein the sodium salt is used in an amount of from 0.03 to 5.0 phr.

4. A process according to claim 1 wherein the delayed action gelling system comprises sodium or potassium silicofluoride.

5. A process according to claim 1 wherein the amount of gelling agent in the gelling system is in the range 1.00 to 4.00 phr.

6. A process according to claim 1 wherein the mould used is made of a non-conducting material.

7. A process according to claim 1 wherein the mould used is made of wood, glass fibre reinforced polyester, reinforced phenolic resin or a mixture of these.

8. A process according to claim 1 wherein the mould is heated prior to filling with the latex composition.

9. A process according to claim 1 wherein the frequency of the microwave is in the range 800 to 2,500 mc/sec.

10. A process according to claim 1 wherein the intensity of the radiation is 0.5 to 5.0 Kw per kilogramme of latex composition.

11. A process according to claim 10 wherein the intensity of the radiation is 1.5 to 2.3 Kw per kilogramme of latex composition.

12. A process according to claim 1 wherein the rubber latex is a synthetic latex prepared in emulsion using one or more anionic emulsifiers.

13. A process according to claim 1 wherein the mould used is made of a material having a loss factor lower than the loss factor of the latex composition measured at the frequency of the radiation.

14. A process according to claim 1 wherein there is included an alkali metal halide.

15. A process according to claim 2 wherein the halide is potassium chloride.

16. A process according to claim 1 wherein up to 75 phr of filler is included in the latex composition.

17. A process according to claim 16 wherein 20 to 40 phr of filler is included.

18. A modification of the process claimed in claim 1 wherein the delayed action gelling system is wholly or partly a heat sensitive gelling system.

19. A process according to claim 18 wherein the gelling system comprises zinc oxide and ammonium acetate.

20. A process according to claim 1 wherein gelling occurs in 5 to 15 seconds.

21. A process according to claim 1 wherein the rubber latex is reinforced with a non-rubber latex selected from the group consisting of polystyrene latex and polyvinyl chloride latex.

22. A process according to claim 21 wherein the non-rubber latex is present in an amount of up to 50 phr on a dry weight basis.

* * * * *